UNITED STATES PATENT OFFICE.

PAUL BÖTTIGER, OF GÖSSNITZ, SAXE-ALTENBURG, ASSIGNOR TO THE ACTIENGESELLSCHAFT FÜR ANILIN FABRIKATION, OF BERLIN, GERMANY.

COMBINATION OF THE SALTS OF TETRAZO-DIPHENYL AND THE NAPHTHYLAMINES.

SPECIFICATION forming part of Letters Patent No. 365,667, dated June 28, 1887.

Application filed April 24, 1885. Serial No. 163,272. (No specimens.)

*To all whom it may concern:*

Be it known that I, PAUL BÖTTIGER, a subject of the King of Saxony, Germany, residing at the city of Gössnitz, in the Duchy of Saxe-Altenburg, Germany, have invented a certain new and useful Combination of the Salts of Tetrazo-Diphenyl and the Naphthylamines, of which the following is a specification.

By the action of salts of tetrazo-diphenyl on the naphthylamines or their sulpho-acids new substances are formed, which can be used as red coloring-matters. The substances obtained in this way from alpha or beta naphthylamine are insoluble in water, and must be converted into their sulpho-acids before they can be used for dyeing, whereas the substances obtained from the sulpho-acids of both the naphthylamines can at once be employed as coloring-matters.

The above-named new substances are produced in the following manner:

*First method.*—25.7 kilograms of chloride of benzidine or 28.2 of sulphate of benzidine are well mixed with thirty kilograms of muriatic acid of 20° Baumé and five hundred liters of water. A solution of 13.8 kilograms of nitrite of sodium in one hundred and fifty liters of water is then added. The solution of the chloride or sulphate of tetrazo-diphenyl obtained in this way is run into a solution of 36.5 kilograms of chloride of alpha or beta naphthylamine in two thousand liters of water. The precipitate formed thereby is dried and converted by fuming sulphuric acid (containing twenty per cent. of anhydride) into its sulpho-acids, the salts of which represent the coloring-matters.

*Second method.*—The solution of the salts of tetrazo-diphenyl obtained in the above way is run into a solution of fifty-five kilograms of naphthionate of soda and twelve kilograms of acetate of soda in one thousand liters of water. After having stood for about twelve hours the paste obtained is brought on a filter. The acid thus formed is converted into the sodium or ammonium salt, and represents the coloring-matter.

The process for making this red coloring-matter is more especially set forth in a separate application for Letters Patent filed November 22, 1884, Serial No. 148,595, to which reference is made.

I claim—

The red dye-stuff or coloring-matter which results from the sulphonated combination of the salts of tetrazo-diphenyl and the naphthylamines, substantially as set forth.

In testimony whereof I have signed my name to this specification in the presence of two subscribing witnesses.

PAUL BÖTTIGER.

Witnesses:
 EDMUND DÖRFFEL,
 R. HAUPT.